(12) United States Patent
Kopp et al.

(10) Patent No.: US 11,512,163 B2
(45) Date of Patent: Nov. 29, 2022

(54) POLYASPARTICS WITH LONG POT LIFE AND FAST CURING

(71) Applicant: SIKA TECHNOLOGY AG, Baar (CH)

(72) Inventors: Denis Kopp, Filderstadt (DE); Hagen Schweigert, Kohlberg (DE)

(73) Assignee: SIKA TECHNOLOGY AG, Baar (CH)

( * ) Notice: Subject to any disclaimer, the term of this patent is extended or adjusted under 35 U.S.C. 154(b) by 240 days.

(21) Appl. No.: 16/768,764

(22) PCT Filed: Nov. 27, 2018

(86) PCT No.: PCT/EP2018/082731
§ 371 (c)(1),
(2) Date: Jun. 1, 2020

(87) PCT Pub. No.: WO2019/105947
PCT Pub. Date: Jun. 6, 2019

(65) Prior Publication Data
US 2021/0171702 A1    Jun. 10, 2021

(30) Foreign Application Priority Data

Dec. 1, 2017  (EP) .................................... 17204894

(51) Int. Cl.
| | |
|---|---|
| *C08G 18/38* | (2006.01) |
| *C08G 18/79* | (2006.01) |
| *C08K 3/26* | (2006.01) |
| *C08K 3/32* | (2006.01) |
| *C09D 175/02* | (2006.01) |
| *C08K 3/30* | (2006.01) |

(52) U.S. Cl.
CPC ....... *C08G 18/3821* (2013.01); *C08G 18/792* (2013.01); *C08K 3/26* (2013.01); *C08K 3/32* (2013.01); *C09D 175/02* (2013.01); *C08K 2003/262* (2013.01); *C08K 2003/3063* (2013.01); *C08K 2003/325* (2013.01); *C08K 2003/326* (2013.01)

(58) Field of Classification Search
CPC .......................... C09D 175/02; C08G 18/3821
See application file for complete search history.

(56) References Cited

U.S. PATENT DOCUMENTS

| | | | |
|---|---|---|---|
| 5,736,604 A | 4/1998 | Luthra | |
| 2016/0024339 A1* | 1/2016 | Squiller | C08G 18/3821 524/589 |
| 2017/0355862 A1* | 12/2017 | Marauska | C08K 3/016 |

FOREIGN PATENT DOCUMENTS

| | | |
|---|---|---|
| WO | 2006/030029 A1 | 3/2006 |
| WO | 2012/069623 A1 | 5/2012 |
| WO | 2014/151307 A1 | 9/2014 |
| WO | 2016/087350 A1 | 6/2016 |
| WO | 2016/210237 A1 | 12/2016 |

OTHER PUBLICATIONS

Donkers et al. A review of salt hydrates for seasonal heat storage in domestic applications. Applied Energy 2017, 199, 45-68. (Year: 2017).*
Mar. 7, 2019 International Search Report issued in International Patent Application No. PCT/EP2018/082731.
Mar. 7, 2019 Written Opinion issued in International Patent Application No. PCT/EP2018/082731.

* cited by examiner

*Primary Examiner* — Stephen E Rieth
(74) *Attorney, Agent, or Firm* — Oliff PLC

(57) ABSTRACT

A two-component polyurea compositions including a polyisocyanate component and a hardener component. The hardener component includes at least a derivative of aspartic acid and at least one salt hydrate with a decomposition temperature of between 30° C. and 150° C. This composition allows to be applied to a large area and/or thick layers or high volume casts and shows fast curing triggered by heat but long pot life at application temperature.

14 Claims, No Drawings

POLYASPARTICS WITH LONG POT LIFE AND FAST CURING

TECHNICAL FIELD

The invention relates to the field of two-component polyurea compositions containing polyaspartic ester hardeners.

BACKGROUND OF THE INVENTION

Two-component polyurea compositions have been known for a long time and are broadly used, for example for the preparation of coating and flooring products or cast resins. Among those, so-called polyaspartic resins possess unique properties and application fields, since they contain as hardener components special sterically hindered secondary amines, known as polyaspartic esters. These two-component aspartic compositions have the advantages of low viscosity, ultra-high solids content, high reactivity and excellent chemical, physical, and weathering resistance.

However, based on their curing chemistry, they suffer from an intrinsic problem: They can either be formulated to show fast curing after application, which is desirable for an efficient and economically feasible process, but then their pot life is commonly very short which makes large-area application difficult. On the other hand they can be formulated to possess a long pot life more suitable for application of large volumes, but then require a considerable curing and thus waiting time until the curing is completed.

Classical polyurethane catalysts are not always readily suitable for this system, probably due to the sterically hindered amine hardener.

An approach to solve this problem is the use of a latent hardener or catalyst. For example WO 2006/030029 discloses a polyurethane composition comprising a polyisocyanate, a polythiol and a latent base catalyst. Due to toxic ingredients, however, such a system is disadvantageous in view of safety and environment hazards. Furthermore, polythiols tend to smell unpleasantly.

One efficient catalyst or accelerator for polyaspartics is water. However, it is difficult to use water in a controlled way. It is possible to simply add water to the hardener component, which leads to significantly accelerated curing, but at the same time drastically reduces the pot life. Also, simply increasing the humidity of the surrounding air does not sufficiently solve the problem, since acceleration only takes place near the surface and thus it is only feasible for very thin layers or coatings and much less for cast applications.

U.S. Pat. No. 5,736,604 discloses an aqueous polyurethane composition which is used for the preparation of coatings. The aqueous coating composition has a 20 to 96% solids content and the large amount of water is used as a nonorganic solvent leading to improved application characteristics and fast cure. However, despite the fact that this system shows a fast cure these compositions are limited to small area applications. Furthermore, the comparably low solids content and the requirement of water to evaporate limits the applicability further.

WO 2012/069623 discloses a three-component polyaspartic composition, using as third component a substance with weakly bound or absorbed water, which is brought in contact with the mixed two-component composition of a polyisocyanate and a polyaspartic ester. This solution is somewhat cumbersome to apply with an additional process step and also mostly brings water to the surface of an already applied mixed composition, and thus is not very suitable for cast or thick layer applications.

WO 2014/151307 discloses a special polyaspartics composition including a polyetheraspartic ester in the hardener component. This composition seems to have increased pot life but still fast curing, possibly due to its higher hydrophilicity, but requires the use of a not so common polyetheraspartic ester that is commercially not readily available and somewhat limits the chemical and physical properties of the product compared to traditional polyaspartics since polyether segments are inevitably incorporated in the cured composition. Furthermore, it is also not very suitable for cast or thick layer applications.

A two-component polyaspartics polyurea composition with long pot life but fast curing, which is not limited by low solids content or specific incorporated polymer segments, and which can be used also for cast or thick layer applications, remains therefore desirable.

SUMMARY OF THE INVENTION

Therefore, the problem to be solved by the present invention is to offer a polyurea composition able to be applied to a large area and/or thick layers or in cast applications and showing long pot life and fast curing without limitations regarding the polymeric network or the solids content and without being problematic or toxic to health and environment.

Unexpectedly and very surprisingly, this problem was solved by the two-component polyurea composition disclosed herein.

A polyisocyanate component C1 and a hardener component C2 are reactive after mixing and their curing is accelerated by a salt hydrate comprised in the hardener component C2. Said salt hydrate decomposes into free water and a salt with a lower degree of hydration when the mixture is heated above the decomposition temperature of the salt hydrate. The free water then acts as efficient catalyst or accelerator for the curing mechanism of the polyurea composition. This allows a formulated system comprising a polyisocyanate component C1 and a hardener component C2 that cures rapidly when heated and thus represents a polyurea system having a sufficiently long open time for a large area or large volume application without premature cure. At the same time, however, when heat is applied to the mixture after application, curing takes place in a controlled and rapid fashion, which significantly reduces the waiting time until curing is completed.

Due to the broad variety of possible salt hydrate materials to which the water is bound, the salt hydrate can be easily selected so that the ecotoxic impact is minimal. Furthermore, due to the individual decomposition temperature of each salt hydrate, the heat treatment and curing temperature can be adapted to any desired process by choosing a salt hydrate with a suitable decomposition temperature and degree of hydration. Additionally, the extent of acceleration and thus the curing rate can also be fine-tuned by the amount of salt hydrate incorporated. With finely dispersed salt hydrate within the mixture, a homogeneous acceleration through the whole layer or volume can be achieved. This is also based on the fact that the exothermic reaction of the polyurea hardening creates heat which leads to the decomposition of the salt hydrate also in inner parts of a cast. This, in turn, will lead to a release of water which will then catalyze the reaction further, propagating through the whole volume.

The composition of the invention is extremely well suited for their application as coating, flooring, or cast material and is in particular suitable for thick layer coating or large volume cast applications.

Particularly preferred embodiments of the invention are the subject matter of the dependent claims.

DETAILED DESCRIPTION OF THE INVENTION

The present invention relates to a three component polyurea composition which consists of a polyisocyanate component C1 and a hardener component C2;

The polyisocyanate component C1 comprises at least a polyisocyanate PI;

The hardener component C2 comprises at least a compound of formula (I),

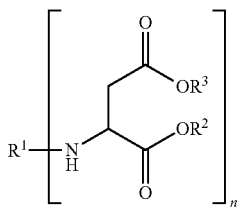

wherein
$R^1$ represents a n-valent organic radical
$R^2$ and $R^3$ represent independently of one another an aliphatic or
cycloaliphatic or aromatic radical.
n is a value of 2 to 6, particularly 2 or 3.
characterized in that
the hardener component C2 comprises at least one salt hydrate SH with a decomposition temperature of between 30° C. and 150° C.

The term "polyisocyanate" in the present document encompasses compounds having two or more isocyanate groups, independently of whether they are monomeric diisocyanates, oligomeric polyisocyanates, or polymers containing isocyanate groups and having a relatively high molecular weight (typically larger than 1000 g/mol).

The term "polymer" in the present document encompasses on the one hand a collective of macromolecules which, while being chemically uniform, nevertheless differ in respect of degree of polymerization, molar mass, and chain length, and have been prepared by a polymerization reaction (chain-growth addition polymerization, polyaddition, polycondensation, radical polymerization). The term also, moreover, encompasses derivatives of such a collective of macromolecules from polymerization reactions, in other words compounds which have been obtained by means of reactions, such as additions or substitutions, for example, of functional groups on existing macromolecules, and which may be chemically uniform or chemically nonuniform. The term also encompasses, furthermore, what are known as prepolymers, by which are meant reactive oligomeric preadducts whose functional groups take part in the construction of macromolecules.

The term "functionality" in connection with a molecule describes in this document the number of chemical functional groups per molecule. The term "polyfunctional" describes a molecule with more than 1 functional groups of a given type. For example, a polyfunctional amine with a functionality of 3 describes a molecule with 3 amino groups. The term "average functionality" is used if a mixture of molecules is present that differ slightly in individual functionality, but in average exhibit a given functionality, as it is sometimes the case with technical grade chemicals.

In the present document, substance names beginning with "poly", such as polyisocyanate or polyol or polythiol denote substances which, in a formal sense, contain two or more of the functional groups which occur in their name per molecule. The compound can be a monomeric, oligomeric or polymeric compound. For instance, a polyol is a compound having two or more hydroxy groups; a polyisocyanate is a compound having two or more isocyanate groups.

The unit term "wt.-%" means percentage by weight, based on the weight of the respective total composition, if not otherwise specified. The terms "weight" and "mass" are used interchangeably throughout this document.

The average molecular weight of a polymer is understood to mean the number average molecular weight, as determined using conventional methods, preferably by gel permeation-chromatography (GPC) using polystyrene as standard, styrene-divinylbenzene gel with porosity of 100 Angstrom, 1000 Angstrom and 10000 Angstrom as the column and tetrahydrofurane as a solvent, at 35° C.

All industrial norms mentioned in this document are referring to the respective current versions at the time of filing.

"Room temperature" means in the present document a temperature of 23° C.

The person skilled in the art in this field uses frequently the term "two-part" instead of the term "two-component" mentioned before. In any of these cases a chemically reactive system is meant which comprises of individual reactive ingredients which are stored in two separate compartments, respectively packs, in order to avoid the spontaneous reaction between said reactive ingredients.

The term "pot life" describes the period of time for which the curing and/or solidification of a mixture of two mutually reactive components has not yet progressed to an extent that it cannot be applied anymore. In other words, it is the maximal time in which the composition may be applied at the application temperature. The application temperature is typically a temperature between 0° C. and 60° C., typically about 23° C.

In the present document, the bold-labelling of references such as C1, C2, PI, SH is used only for better reading comprehension and identification.

The polyisocyanate component C1 comprises at least a polyisocyanate.

In one embodiment the polyisocyanate PI is a monomeric polyisocyanate, particularly a monomeric diisocyanate or triisocyanate.

Said monomeric polyisocyanate may be an aromatic or an aliphatic polyisocyanate. Preferred monomeric polyisocyanate are aliphatic polyiso-cyananates.

"Aromatic polyisocyanate" identifies an organic compound which contains exclusively aromatic isocyanate groups. "Aromatic" identifies an isocyanate group which is attached to an aromatic or heteroaromatic radical. "Aliphatic polyisocyanate" identifies an organic compound which contains aliphatic isocyanate groups. "Aliphatic" identifies an isocyanate group which is attached to an aliphatic, cycloaliphatic or arylaliphatic radical.

Examples of suitable aromatic monomeric polyisocyanates include polyisocyanates such as 2,4- and 2,6-tolylene diisocyanate and any desired mixtures of these isomers (TDI), 4,4'-, 2,4'- and 2,2'-diphenylmethane diisocyanate and any desired mixtures of these isomers (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatobiphenyl (TODI), dianisidine diisocyanate (DADI), 1,3,5-tris(isocyanatomethyl)benzene, tris(4-isocyanatophenyl)methane and tris-(4-isocyanatophenyl) thiophosphate.

Examples of suitable aliphatic monomeric polyisocyanates include polyisocyanates such as 1,4-tetramethylene diisocyanate, 2-methylpentamethylene 1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine diisocyanate and lysine ester diisocyanate, cyclohexane-1,3- and 1,4-diisocyanate, 1-methyl-2,4- and 2,6-diisocyanatocyclohexane and any desired mixtures of these isomers (HTDI or $H_6TDI$), 1-isocyanato-3,3,5-trimethyl-5-isocyanatomethylcyclohexane (=isophorone diisocyanate or IPDI), perhydro-2,4'- and 4,4'-diphenylmethane diisocyanate (HMDI or $H_{12}MDI$), 1,4-diisocyanato-2,2,6-trimethylcyclohexane (TMCDI), 1,3- and 1,4-bis(isocyanatemethyl)cyclohexane, m- and p-xylylene diisocyanate (m- and p-XDI), m- and p-tetramethyl-1,3-xylylene diisocyanate and -1,4-xylylene diisocyanate (m- and p-TMXDI), bis(1-isocyanato-1-methylethyl)naphthalene, dimer and trimer fatty acid isocyanates such as 3,6-bis(9-isocyanatononyl)-4,5-di-(1-heptenyl)cyclohexane (dimeryl diisocyanate) and $\alpha,\alpha,\alpha',\alpha',\alpha'',\alpha''$-hexamethyl-1,3,5-mesitylene triisocyanate.

In a further embodiment the polyisocyanate PI is an oligomeric polyisocyanate of the above mentioned monomeric polyisocyanates.

Suitable oligomers of a monomeric diisocyanate include more particularly the oligomers of HDI, IPDI and TDI. In practice, such oligomers usually constitute mixtures of substances having different degrees of oligomerization and/or chemical structures. They preferably have an average NCO functionality of 2.1 to 4.0 and contain, more particularly isocyanurate groups, iminooxadiazinedione groups, uretdione groups, urethane groups, biuret groups, allophanate groups, carbodiimide groups, uretonimine groups or oxadiazinetrione groups. They preferably have a low monomeric diisocyanate content. Commercially available products are, more particularly, HDI biurets, for example Desmodur® N 100 and Desmodur® N 3200 (from Bayer), Tolonate® HDB and Tolonate® HDB-LV (from Perstorp) and also Duranate® 24A-100 (from Asahi Kasei); HDI isocyanurates, examples being Desmodur® N 3300, Desmodur® N 3600 and Desmodur® N 3790 BA (from Bayer), Desmodur® N 3390 BA (from Bayer), Tolonate® HDT, Tolonate® HDT-LV and Tolonate® HDTLV2 (from Perstorp), (Duranate® TPA-100 and Duranate® THA-100 (from Asahi Kasei) and also Coronate® HX (from Nippon Polyurethane); HDI uretdiones, an example being Desmodur® N 3400 (from Bayer); HDI iminooxadiazinediones, an example being Desmodur® N 3900 (from Bayer); HDI allophanates, an example being Desmodur® VP LS 2102 (from Bayer); IPDI isocyanurates, examples being Desmodur® Z 4470 (from Bayer) and Vestanat® T1890/100 (from Evonik); TDI oligomers, an example being Desmodur® IL (from Bayer); and also mixed isocyanurates based on TDI/HDI, as for example Desmodur® HL (from Bayer).

In a further embodiment the polyisocyanate PI is a polyurethane polymer containing isocyanate groups.

The term "polyurethane polymer" encompasses all polymers which are prepared by the process known as the diisocyanate polyaddition process. This also includes those polymers which are entirely or virtually free from urethane groups. Examples of polyurethane polymers are polyether-polyurethanes, polyester-polyurethanes, polyether-polyureas, polyureas, polyester-polyureas, polyisocyanurates and polycarbodiimides.

One suitable polyurethane polymer is obtainable more particularly from the reaction of at least one polyol with at least one polyisocyanate, particularly with a monomeric polyisocyanates and/or an oligomeric polyisocyanate being both mentioned above.

This reaction may involve the polyol and the polyisocyanate being reacted by customary methods, at temperatures, for example of 50° C. to 100° C., optionally with accompanying use of suitable catalysts, the amount of the polyisocyanate being such that its isocyanate groups are present in a stoichiometric excess in relation to the hydroxyl groups of the polyol. The amount of the polyisocyanate is advantageous such that an NCO/OH ratio of 1.3 to 5, more particularly of 1.5 to 3, is observed. The "NCO/OH ratio" means the ratio of the number of isocyanate groups used to the number of hydroxyl groups used. After the reaction of all of the hydroxyl groups of the polyol, the polyurethane polymer preferably retains a free isocyanate group content of 0.5 to 15% by weight, more preferably of 0.5 to 10% by weight.

The polyols which can be used for preparing a polyurethane polymer include, for example, the following commercially customary polyols or mixtures thereof:

polyoxyalkylene polyols, also called polyether polyols or oligoetherols, which are polymerization products of ethylene oxide, 1,2-propylene oxide, 1,2- or 2,3-butylene oxide, oxetane, tetrahydrofuran or mixtures thereof, optionally polymerized by means of a starter molecule having two or more active hydrogen atoms, such as, for example, water, ammonia or compounds having two or more OH or NH groups, such as, for example, 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and also mixtures of the aforementioned compounds. Use may be made not only of polyoxyalkylene polyols which have a low degree of unsaturation (measured in accordance with ASTM D-2849-69 and expressed in milliequivalents of unsaturation per gram of polyol (meq/g)), prepared, for example, by means of what are called double metal cyanide complex catalysts (DMC catalysts), but also of polyoxyalkylene polyols having a higher degree of unsaturation, prepared, for example, by means of anionic catalysts such as NaOH, KOH, CsOH or alkali metal alkoxides.

Particularly suitable are polyoxyalkylene diols or polyoxyalkylene triols, more particularly polyoxyethylene and polyoxypropylene diols and triols.

Especially suitable are polyoxyalkylene diols and triols having a degree of unsaturation of less than 0.02 meq/g and having a molecular weight in the range of 1000-30000 g/mol, and also polyoxypropylene diols and triols having a molecular weight of 400-8000 g/mol.

Likewise particularly suitable are what are called ethylene oxide-terminated ("EO-end capped", ethylene oxide-end capped) polyoxypropylene polyols. The latter are special polyoxypropylene-polyoxyethylene polyols which are obtained, for example, by further alkoxylating pure polyoxypropylene polyols, more particularly polyoxypropylene diols and triols, with ethylene oxide after the end of the polypropoxylation reaction, and as a result contain primary hydroxyl groups.

Styrene-acrylonitrile or acrylonitrile-methyl methacrylate-grafted polyether polyols.

Polyester polyols, also called oligoesterols, prepared for example from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentylglycol, glycerol, 1,1,1-trimethylolpropane or mixtures of the aforementioned alcohols with organic dicarboxylic acids or their anhydrides or esters such as, for example, succinic acid, glutaric acid, adipic acid, suberic acid, sebacic acid, dodecanedicarboxylic acid, maleic acid, fumaric acid, phthalic acid, isophthalic acid, terephthalic acid and hexahydrophthalic acid or mixtures of the aforementioned acids, and also polyester polyols from lactones such as ε-caprolactone, for example.

Polycarbonate polyols, of the kind obtainable by reaction, for example, of the abovementioned alcohols—those used to construct the polyester polyols—with dialkyl carbonates, diaryl carbonates or phosgene.

Block copolymers which carry at least two hydroxyl groups and which contain at least two different blocks with polyether, polyester and/or polycarbonate structure of the type described above.

Polyacrylate polyols and polymethacrylate polyols.

Polyhydrocarbon polyols, also called oligohydrocarbonols, such as, for example, polyhydroxy-functional ethylene-propylene, ethylene-butylene or ethylene-propylene-diene copolymers, of the kind produced, for example, by the company Kraton Polymers, or polyhydroxy-functional copolymers of dienes such as 1,3-butanediene or diene mixtures and vinyl monomers such as styrene, acrylonitrile or isobutylene, or polyhydroxy-functional polybutadiene polyols, such as, for example, those which are prepared by copolymerization of 1,3-butadiene and allyl alcohol and which may also have been hydrogenated.

Polyhydroxy-functional acrylonitrile/butadiene copolymers, of the kind preparable, for example, from epoxides or amino alcohols and carboxylterminated acrylonitrile/butadiene copolymers (available commercially under the name Hypro® CTBN from Emerald Performance Materials).

These stated polyols preferably have an average molecular weight of 250-30000 g/mol, more particularly of 400-20000 g/mol, and preferably have an average OH functionality in the range from 1.6 to 3.

Preferred polyols are polyether, polyester, polycarbonate and polyacrylate polyols, preferably diols and triols. Particularly preferred are polyether polyols, more particularly polyoxypropylene polyols and polyoxypropylene-polyoxyethylene polyols.

The polyisocyanate PI is preferably diisocyanate or triisocyanate or a oligomer thereof.

Suitable di- or triisocyanates are, for example, as follows: 1,4-tetramethylene diisocyanate, 2-methylpentamethylene 1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane 1,3- and 1,4-diisocyanate, 1-methyl-2,4- and -2,6-diisocyanatocyclohexane and any mixtures of these isomers (HTDI or $H_6$TDI), 1-isocyanato-3,3,5-trimethyl-5-isocyanatomethylcyclohexane (=isophorone diisocyanate or IPDI), perhydro-2,4'- and -4,4'-diphenylmethane diisocyanate (HMDI or $H_{12}$MDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3- and -1,4-xylylene diisocyanate (m- and p-TMXDI), bis(1-isocyanato-1-methylethyl)naphthalene, dimer and trimer fatty acid isocyanates such as 3,6-bis(9-isocyanatononyl)-4,5-di(1-heptenyl)cyclohexene (dimeryl diisocyanate), α,α,α',α',α'',α''-hexamethyl-1,3,5-mesitylene triisocyanate, 2,4- and 2,6-tolylene diisocyanate and any mixtures of these isomers (TDI), 4,4'-, 2,4'- and 2,2'-diphenylmethane diisocyanate and any mixtures of these isomers (MDI), mixtures of MDI and MDI homologues (polymeric MDI or PMDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI), dianisidine diisocyanate (DADI), 1,3,5-tris(isocyanatomethyl)benzene, tris(4-isocyanatophenyl)methane and tris(4-isocyanatophenyl) thiophosphate.

The oligomers of the di- or triisocyanates are preferably isocyanurates, iminooxadiazinediones, uretdiones, biurets or allophanates of the di- or triisocyanates mentioned in the previous paragraph.

The polyisocyanate PI is preferably an aliphatic or cycloaliphatic diisocyanate or triisocyanate or an oligomer thereof.

More preferably the polyisocyanate PI is a biuret or an uretdione or an isocyanurate of 1,6-hexamethylene diisocyanate (HDI).

The hardener component C2 comprises at least a compound of formula (I).

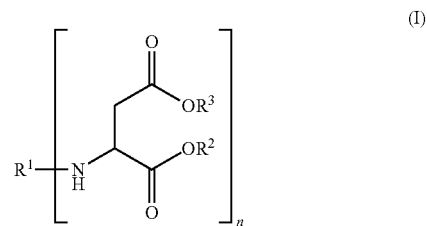

(I)

$R^1$ represents a n-valent organic radical. Particularly, $R^1$ is n-valent aliphatic or cycloaliphatic or aromatic radical. Preferably, $R^1$ is a n-valent cycloaliphatic radical. In a particularly preferred embodiment $R^1$ represents formula (II) or (III) or (IV), particularly of formula (IIa) or (IIIa) or (IVa).

(II)

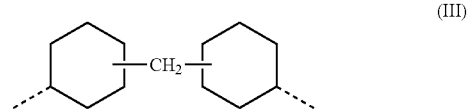

(III)

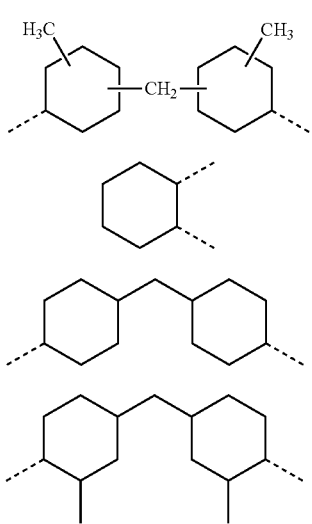

The dotted lines indicate the binding site to the other substituents in the formula (I).

Preferred $R^2$ and $R^3$ are identical. Particularly $R^2$ and $R^3$ are alkyl groups, more preferably an alkyl group with 1 to 6, particularly 1 to 4, carbon atoms. Most preferred $R^2$ and $R^3$ both stand for methyl groups.

Most preferably, n represents a value of 2.

In a preferred embodiment the compound of formula (I) has an amine value of 150-230 mg KOH/g, particularly of 185-205 mg KOH/g.

Further preferred is that the compound of formula (I) has at 25° C. a viscosity of between 700 and 3000 mPas, particularly between 750 and 2500 mPas, measured according to DIN 53 019.

It is preferred that the compound of formula (I) is liquid at room temperature. More preferred the compound of formula (I) has a viscosity of less than 2500 mPas measured at 25° C. according to DIN 56 019.

In a preferred embodiment compound of formula (I) are those being commercially available under the tradename Desmophen® NH from Covestro.

The hardener component C2 comprises at least one salt hydrate SH. The salt hydrate SH comprised in the hardener component C2 acts as a latent catalyst or accelerator for the curing of the polyurea composition. When salt hydrate SH reaches its decomposition temperature, it releases the water molecules bound in its crystal lattice and said water molecules act as actual catalyst or accelerator for the curing of the polyurea composition. It is this necessary that the salt hydrate SH is able to decompose in the defined temperature range by releasing its water, and it is furthermore necessary that the polyurea composition has not yet cured significantly when the water is released in order for the invention to work.

The term "salt hydrate" means a salt, i.e. an organic or inorganic compound consisting of ions, containing water molecules combined in a definite ratio as an integral part of the crystal structure of the salt. These water molecules are weakly bound by hydrogen bonding within the crystal lattice and normally dissociate from the crystal structure when exposed to a specific heat. The decomposition of a salt hydrate to a free water molecule and a salt hydrate of lesser degree of hydration (or, eventually, a water-free salt) is temperature-controlled and the heat required for decomposition is unique for each salt hydrate and each bound water molecule in that salt hydrate. The "degree of hydration" describes the number of water molecules in a given salt formula. For example, $Al_2O_3 \times H_2O$ has a degree of hydration of 1 (containing one water molecule per salt unit), while $Al_2(SO_4)_3 \times 18\ H_2O$ has a degree of hydration of 18 (containing 18 water molecules per salt unit).

Salt hydrates are also called "hydrated salts" or "salts containing water of crystallization".

It is important that the salt hydrate SH is carefully selected according to the required use of the composition, in particular regarding the intended heat treatment. As mentioned before, the decomposition temperature is unique for each salt hydrate and thus the salt hydrate SH should possess a suitable decomposition temperature for the intended application process. For polyaspartics in general, the decomposition temperature of the salt hydrate SH should be in the range of between 30° C. and 150° C. Below 30° C. the storage stability of component C2 is significantly shortened since significant amounts of free water will be comprised therein after a short time, in particular in hot climates. Furthermore, the production of composition C2 is difficult since in mixing and milling processes heat is generated. A decomposition temperature above 150° C. is equally not suitable, since this requires considerable heat generation with high energy consumption, but offers no advantage. Furthermore, applying such high temperatures to the curing materials may lead to weakening or partial destruction of the resin material.

A preferred range for the decomposition temperature of the salt hydrate SH is between 45° C. and 80° C., preferably between 50° C. and 75° C.

Preferred salt hydrates are metal salt hydrates. Among those, preferred are selected from the group consisting of $Al_2O_3 \times H_2O$, $Al_2(SO_4)_3 \times 18\ H_2O$, $Al_2(C_2O_4)_3 \times 4\ H_2O$, $AlNa(SO_4)_2 \times 12\ H_2O$, $AlK(SO_4)_2 \times 12\ H_2O$, $BaCl_2 \times 2\ H_2O$, $Ba(OH)_2 \times 8\ H_2O$, $CaSO_4 \times 2\ H_2O$, $CaS_2O_3 \times 6\ H_2O$, $Ca(NO_3)_2 \times 4\ H_2O$, $CaHPO_4 \times 2\ H_2O$, $Ca(C_2O_4) \times H_2O$, $Ca(CH_3-CH(OH)-COO)_2 \times 5\ H_2O$, $Co(NO_3)_2 \times 6\ H_2O$, $Co(CH_3COO)_2 \times 4\ H_2O$, $CuCl_2 \times 2\ H_2O$, $CuSO_4 \times 5\ H_2O$, $Cu(CH_3COO)_2 \times 2\ H_2O$, $FeCl_2 \times 4\ H_2O$, $FeCl_3 \times 6\ H_2O$, $FeSO_4 \times 7\ H_2O$, $Fe(NH_4)(SO_4)_2 \times 12\ H_2O$, $K_2CO_3 \times 15\ H_2O$, $KNaCO_3 \times 6\ H_2O$, $LiBr \times 2H_2O$, $Li_2SO_4 \times H_2O$, $MgSO_4 \times H_2O$, $MgSO_4 \times 7\ H_2O$, $MgHPO_4 \times 7\ H_2O$, $Mg_3(PO_4)_2 \times 8\ H_2O$, $MgCO_3 \times 3\ H_2O$, $Mg_4(CO_3)_3(OH)_2 \times 3\ H_2O$, $MoO_3 \times 2\ H_2O$, $NaBr \times 2H_2O$, $Na_2SO_3 \times 7\ H_2O$, $Na_2SO_4 \times 10\ H_2O$, $Na_2S_2O_3 \times 5\ H_2O$, $Na_2S_2O_6 \times 2\ H_2O$, $Na_2B_4O_7 \times 10\ H_2O$, $NaHPO_4 \times 5\ H_2O$, $Na_3PO_4 \times 12\ H_2O$, $Na_2CO_3 \times H_2O$, $Na_2CO_3 \times 7\ H_2O$, $Na_2CO_3 \times 10\ H_2O$, $Na(CH_3COO) \times 3H_2O$, $NaHC_2O_4 \times H_2O$, $K/NaC_4H_4O_6 \times 4\ H_2O$, $Na_2SiO_3 \times 9\ H_2O$, $NiSO_4 \times 6\ H_2O$, $NiC_2O_4 \times 2\ H_2O$, $SnO_2 \times n\ H_2O$, $NiC_2O_4 \times 2\ H_2O$, $Sn(SO_4)_2 \times 2\ H_2O$, $ZnSO_3 \times 2\ H_2O$, $ZnSO_4 \times 7\ H_2O$, $Zn_3(PO_4)_2 \times 4\ H_2O$ and $Zn(CH_3COO)_2 \times 2\ H_2O$ or mixtures thereof. Particular preference is given to $CaHPO_4 \times 2\ H_2O$, $NaHPO_4 \times 2\ H_2O$, $LiH_2PO_4$, $MgSO_4 \times 6\ H_2O$, $MgHPO_4 \times 3\ H_2O$, $Na_2SO_4 \times 10\ H_2O$, $Na_2CO_3 \times 10\ H_2O$, $ZnSO_4 \times 7\ H_2O$, and $K/NaC_4H_4O_6 \times 4\ H_2O$, in particular $Na_2SO_4 \times 10\ H_2O$, $Na_2CO_3 \times 10\ H_2O$, $ZnSO_4 \times 7\ H_2O$, $K/NaC_4H_4O_6 \times 4\ H_2O$. Most preferred are $ZnSO_4 \times 7\ H_2O$ and $K/NaC_4H_4O_6 \times 4\ H_2O$.

Preferably, the salt hydrate SH is a metal salt hydrate with an organic or inorganic anion and at least 2, preferably at least 4, bound water molecules per salt ion pair.

The salt hydrate SH is preferably present in the hardener component C2 in the form of finely ground, dispersed particles, where the salt hydrate SH preferably has a particle size of below 100 μm.

Grinding of the salt hydrate SH can be achieved by using a ball mill, pebble mill, rod mill, or any other industrial mill equipment. It is advantageous to introduce the hardener component C2 into the mill when grinding the salt hydrate SH, which leads to a fine dispersion of the salt hydrate particles in the hardener component C2.

It is also possible to use tensides or surfactants to create a mono- or multilayer shell around the salt hydrate particles or to form thermoplastic shells around the particles by a suitable method known to the skilled person in the field of micro-encapsulation. This approach may increase the stability of the particles, in particular heat stability in case of low decomposition temperatures. Generally, sintering or coagulation of finely ground particles is not a problem when ground or milled in the presence of the hardener component C2. Otherwise, tensides or surfactants may improve the stability of the finely ground particles against coagulation or sintering, which is also the case when thermoplastic shells are used.

It is furthermore possible to produce a dispersion of such fine particles of salt hydrate SH in a non-aqueous liquid carrier or solvent, or to produce a highly concentrated master batch of dispersed particles of salt hydrate SH in hardener component C2, which is then added in defined amounts to hardener C2 not containing salt hydrate SH. The master batch approach has the advantage that salt hydrate SH can be introduced into large amounts of hardener component C2 by normal mixing, without the requirement of a mill or grinder on-site.

Preferably, the total amount of water in the composition stemming from the hydrated salt SH structure is 0.2-4% by weight, in particular 0.3-2% by weight, more preferably 0.5-1% by weight, relative to the weight sum of polyisocyanate PI and the compound of formula (I).

The ratio of polyisocyanate component C1 to hardener component C2 is preferably selected so that the ratio of number of isocyanate groups in the polyisocyanate component C1 to the number of NCO-reactive groups in the hardener component C2 is preferably between 0.8 and 1.2, particularly between 0.9 and 1.1, preferably about 1.

The polyisocyanate component C1 and/or the hardener component C2 may comprise further ingredients which are typically known to the person skilled in the art of polyurethanes.

Particularly suited as such ingredients are
- dryers, such as, for example, high-reactivity isocyanates such as p-tosyl isocyanate, orthoformic esters, alkoxysilanes such as tetraethoxysilane, organoalkoxysilanes such as vinyltrimethoxysilane, and organoalkoxysilanes which have a functional group in the position a to the silane group;
- adhesion promoters, more particularly organoalkoxysilanes ("silanes") such as, for example, epoxysilanes, vinylsilanes, (meth)acrylosilanes, isocyanatosilanes, carbamatosilanes, alkylsilanes, S-(alkylcarbonyl)mercaptosilanes and aldiminosilanes, and also oligomeric forms of these silanes;
- stabilizers against heat, light and UV radiation;
- thixotropic agents;
- flow improving additives;
- solvents or plasticizer;
- matting agents;
- soft touch additives;
- flame retardants;
- surface-active substances such as, for example, wetting agents, flow control agents, deaerating agents or defoamers;
- biocides such as, for example algicides, fungicides or fungal growth inhibitors.

If using such further constituents it is advantageous to ensure that they do not significantly affect the storage stability of the components in which they are used. This means that these constituents must not to any significant extent trigger the reactions that lead to cross-linking and/or deactivation during storage.

The polyisocyanate component C1 and the hardener component C2 are stored separately particularly in recipients such as tanks, barrels, canisters, pails or cartridges. Particularly preferred they are stored in vessels which are transportable. In a preferred embodiment components C1 and C2 are individually stored in a dual-chamber package which allows that the two components are stored and transported together assuring the accessibility of the individual components in case of application.

Furthermore preferred they are packed in tight and sealed containment. Particularly the polyisocyanate component C1 is stored in an air and water tight containment.

It is preferred that the polyisocyanate component C1, and the hardener component C2 are storage stable at room temperature for at least 3 month, particularly for at least 6 months, preferably for at least 9 months during which their reactivity and viscosity are not altered by a significant amount. This means that after storage they can still be mixed and applied with the normal application tools and result in a cured product.

In a further aspect the invention relates to a method of catalyzing or accelerating the curing of a polyurea composition comprising the steps of
  i) mixing the polyisocyanate component C1 and a hardener component C2 of the two-component polyurea composition in such a way that the ratio of numbers of isocyanate groups of the polyisocyanate component to the number of NCO-reactive groups of the hardener component is between 0.8 and 1.2 and forming a mixed polyurea composition;
  ii) heating said mixed polyurea composition above the decomposition temperature of the salt hydrate contained therein, preferably within the range of 30° C. and 150° C.

It is preferred that that the heating in step ii) is to a temperature of between 40 and 80° C.

In a further aspect the invention relates to a method of preparing a coating, floor, or cast, comprising the steps of:
  i) mixing the polyisocyanate component C1 and a hardener component C2 of the two-component polyurea composition in such a way that the ratio of numbers of isocyanate groups of the polyisocyanate component to the number of groups being NCO-reactive of the hardener component is between 0.8 and 1.2 and forming a mixed polyurea composition;
  ii) applying, particularly casting, said mixed polyurea composition onto a surface of a substrate or into the cavity of a mold;
  iii) heating said mixed polyurea composition above the decomposition temperature of the salt hydrate contained therein, preferably within the range of 30° C. and 150° C., until the polyurea composition is at least partially cured.

The substrate to which surface the mixed polyurea composition is applied in step ii) of the method of preparing a coating, floor, or cast, is typically a concrete or a resin based floor or coating or the body of a vehicle or a casting mold. It is further preferred that said substrate, except the casting mold, is mechanically and or chemically pretreated. Such pretreatments encompass, more particularly, physical and/or chemical cleaning methods, examples being abrading, sandblasting, brushing, or treatment with cleaners or solvents, or the application of an adhesion promoter, an adhesion promoter solution or a primer.

The preferred embodiment is that the mixed polyurea composition is self levelling. In other words the mixed polyurea composition may be poured onto the surface and levels and is sufficiently fluent to flow and spread on the surface of the substrate mainly due to gravity. The self levelling may be supported by manual spreading.

Due to mixing of the two components C1 and C2 and thereafter heating of the mixed composition the composition cures fast.

The composition yields a coating, floor, or cast having preferably an impeccable surface aspect. In other words a coating, floor, or cast may be formed having no defect on the surface and is suited for high quality coatings, floors, and casts. The floor may be a park deck floor, an industrial floor used in food processing plants, chemical storage areas, warehouses, washrooms, laboratories, food preparation areas and chemical process plants.

In a further aspect the invention relates to the use of a salt hydrate SH with a decomposition temperature of between 30° C. and 150° C. to catalyze or accelerate the curing of a two-component polyurea composition as described further above. All preferred embodiments for the polyurea composition an/or the salt hydrate SH as described above are also valid for this aspect of the invention.

EXAMPLES

The invention is further explained in the following experimental part which, however, shall not be construed as limiting the scope of the invention.

Used Additives

Salt hydrates: $ZnSO_4 \times 7\ H_2O$, $K/NaC_4H_4O_6 \times 4\ H_2O$ (VWR Chemicals) Catalyst: Polycat® SA-1/10 (Air Products)

Sample Preparation

Desmodur® N 3300 (HDI trimer with NCO content of 21.8±0.3%), available from Covestro, was used as polyisocyanate component C1-1 and was mixed with Desmophen® NH 1420 (polyaspartic secondary amine with amine value of 199-203), available from Covestro, being hardener component C2-1, in a weight ratio C1-1:C2-1 of 100:70.

The hardener component C2-1 comprised an amount of water or of a salt hydrate or catalyst, respective of the experiment detailed in Table 1. The salt hydrate (or water or catalyst) was introduced into the hardener of the individual sample by first mixing 250 g hardener resin with the given amount of salt hydrate (or water, or catalyst) during 5 min, then adding the mixture to a bead mill wherein furthermore 50 vol.-% of ZrO beads (2 mm diameter) with respect to the volume of the resin were added. The mixture with the beads was milled during 30 min until a homogeneous mixture was obtained. Care was taken, by employing cooling and/or intermittently pausing the mixing procedure, that the decomposition temperature of the respective salt hydrate or catalyst was not exceeded during mixing.

Sample Testing

After mixing of the polyisocyanate component C1-1 and the hardener component C2-1 comprising water or the respective metal salt or catalyst, the thus obtained mixture was immediately applied to a viscometer of the manufacturer Anton Paar employed with a plate-plate measuring setup for an amplitude controlled oscillating test. The upper plate had a diameter of 25 mm, the gap between the plates was 0.5 mm, frequency omega was 10 rad s$^{-1}$, and amplitude gamma 0.1%. Viscosity measurements were performed at 20° C., 50° C., and 80° C., respectively. Curing of the samples took place in the viscometer setup and was monitored by viscosity measurements.

To assess the pot life of the mixture, the time was recorded in each experiment until the gel-point was reached. The gel-point was defined as the time, when tan(δ) ("tan delta"; ratio of loss modulus to storage modulus) reached the value of 1.

To assess the curing rate, the time was recorded in each experiment until curing had so significantly proceeded that the mixture was practically cured. This was defined as the time, when tan(δ) ("tan delta"; ratio of loss modulus to storage modulus) reached the value of 0.1.

Test Results

The results are shown in Table 1. In Table 1, the wt.-% refer to the amount of accelerating additive in each experiment, with respect to the total weight of the two-component composition. The amount of salt hydrate in each experiment was adjusted according to the amount of water molecules bound by hydration contained therein. Experiments 1-3 show non-accelerated reference experiments, and experiments 4-6 and 7-9 show non-inventive reference experiments comprising free water that was mixed into component C2-1 using the mixing method detailed above. Experiments 16-18 show reference experiments using a heat-activated traditional polyurethane/polyurea catalyst based on a blocked tertiary amine.

Best results are considered those of compositions with a long pot life at application temperature (20° C.) but fast curing at slightly elevated temperature (50° C.). The most relevant data is highlighted in bold print.

The results in Table 1 show that the addition of salt hydrates according to the present invention leads to a significantly prolonged pot life compared to free water-accelerated mixtures, but when slightly heated, fast curing takes place which clearly exceeds the curing speed of non-accelerated mixtures. Interestingly, using a traditional heat-activated catalyst based on a blocked tertiary amine has a strong delaying effect on the curing, regardless of the temperature. Compositions according to the present invention thus have usefully long pot-lives, but can be led to a fast curing after application of the mixture by applying moderate heat.

TABLE 1

Experiments and results. "n/m" means not measureable (>3 h).

| Exp. | Additive | wt.-% | T [° C.] | Time to gel-point (tan δ = 1) [min] | Curing time (tan δ = 0.1) [min] |
|---|---|---|---|---|---|
| 1 | — | 0.00 | 20 | 94.0 | 156.0 |
| 2 | | | 50 | 75.7 | 112.0 |
| 3 | | | 80 | 18.4 | 120.0 |
| 4 | $H_2O$ | 0.50 | 20 | 26.9 | 40.8 |
| 5 | | | 50 | 19.2 | 30.2 |
| 6 | | | 80 | 6.8 | 76.6 |
| 7 | $H_2O$ | 1.00 | 20 | 16.1 | 24.9 |
| 8 | | | 50 | 11.4 | 18.4 |
| 9 | | | 80 | 3.8 | 70.0 |
| 10 | $ZnSO_4 \times 7\ H_2O$ | 2.28 | 20 | 62.8 | 102.1 |
| 11 | | | 50 | 19.8 | 56.2 |
| 12 | | | 80 | 1.8 | 102.3 |
| 13 | $K/NaC_4H_4O_6 \times 4$ | 3.92 | 20 | 121.0 | 174.0 |

TABLE 1-continued

Experiments and results. "n/m" means not measureable (>3 h).

| Exp. | Additive | wt.-% | T [° C.] | Time to gel-point (tan δ = 1) [min] | Curing time (tan δ = 0.1) [min] |
|---|---|---|---|---|---|
| 14 | H$_2$O | | 50 | 21.4 | 55.6 |
| 15 | | | 80 | 6.5 | n/m |
| 16 | Polycat | 1.00 | 20 | n/m | n/m |
| 17 | SA-1/10 | | 50 | n/m | n/m |
| 18 | | | 80 | 44.9 | n/m |

The invention claimed is:

1. A two-component polyurea composition, comprising a polyisocyanate component C1 and a hardener component C2,
wherein
the polyisocyanate component C1 comprises at least a polyisocyanate PI;
the hardener component C2 comprises at least a compound of formula (I)

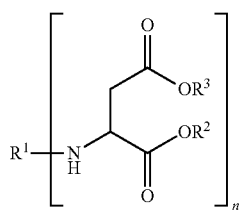

where:
R$^1$ represents a n-valent organic radical;
R$^2$ and R$^3$ represent independently of one another an aliphatic or cycloaliphatic or aromatic radical; and
n is an integer with a value of 2 to 6;
wherein
the hardener component C2 comprises at least one salt hydrate SH with a decomposition temperature of between 30° C. and 150° C.; and
a total amount of water in the two-component polyurea composition stemming from the salt hydrate SH is in a range of from 0.2% to 2% by weight, relative to a weight sum of the polyisocyanate PI and the compound of formula (I).

2. The two-component polyurea composition according to claim 1, wherein the compound of formula (I) has an amine value of 150-230 mg KOH/g.

3. The two-component polyurea composition according to claim 1, wherein the compound of formula (I) has at 25° C. a viscosity of between 700 and 3000 mPas, measured according to DIN 53 019.

4. The two-component polyurea composition according to claim 1, wherein the polyisocyanate PI is: (i) an aliphatic or cycloaliphatic diisocyanate, (ii) an aliphatic or cycloaliphatic triisocyanate, or (iii) an oligomer of (i) or (ii).

5. The two-component polyurea composition according to claim 1, wherein the polyisocyanate PI is a biuret of 1,6-hexamethylene diisocyanate (HDI), an uretdione of HDI, or an isocyanurate of HDI.

6. The two-component polyurea composition according to claim 1, wherein the salt hydrate SH is a metal salt hydrate with an organic or inorganic anion and at least 2 bound water molecules per salt ion pair.

7. The two-component polyurea composition according to claim 1, wherein the salt hydrate SH has a decomposition temperature of between 45° C. and 80° C.

8. The two-component polyurea composition according to claim 1, wherein the salt hydrate SH is selected from the group consisting of CaHPO$_4$×2H$_2$O, NaHPO$_4$×2H$_2$O, LiH$_2$PO$_4$, MgSO$_4$×6H$_2$O, MgHPO$_4$×3H$_2$O, Na$_2$SO$_4$×10H$_2$O, Na$_2$CO$_3$×10H$_2$O, ZnSO$_4$×7H$_2$O, and K/NaC$_4$H$_4$O$_6$×4H$_2$O, or mixtures thereof.

9. The two-component polyurea composition according to claim 1, wherein the salt hydrate SH is present in the hardener component C2 in the form of finely ground, dispersed particles having a particle size of below 100 μm.

10. A method of catalyzing or accelerating the curing of the two-component polyurea composition according to claim 1, comprising
i) mixing the polyisocyanate component C1 and the hardener component C2 of the two-component polyurea composition in such a way that the ratio of the number of isocyanate groups of the polyisocyanate component C1 to the number of NCO-reactive groups of the hardener component C2 is between 0.8 and 1.2 and forming a mixed polyurea composition; and
ii) heating the mixed polyurea composition above the decomposition temperature of the salt hydrate SH contained therein.

11. The method according to claim 10, wherein the heating in step ii) is to a temperature of between 40° C. and 80° C.

12. A method of preparing a coating, floor, or cast with the two-component polyurea composition of claim 1, comprising
i) mixing the polyisocyanate component C1 and the hardener component C2 of the two-component polyurea composition in such a way that the ratio of the number of isocyanate groups of the polyisocyanate component C1 to the number of groups being NCO-reactive of the hardener component C2 is between 0.8 and 1.2 and forming a mixed polyurea composition;
ii) applying the mixed polyurea composition onto a surface of a substrate or into a cavity of a mold; and
iii) heating the mixed polyurea composition above the decomposition temperature of the salt hydrate SH contained therein until the polyurea composition is at least partially cured.

13. The method according to claim 12, wherein the mixed polyurea composition is self-levelling.

14. A coating, floor, or cast obtained by a method according to claim 12.

* * * * *